Oct. 19, 1965    H. B. BIEHN    3,212,625
CONVEYOR BUCKET CONSTRUCTION
Filed March 28, 1963    2 Sheets-Sheet 1
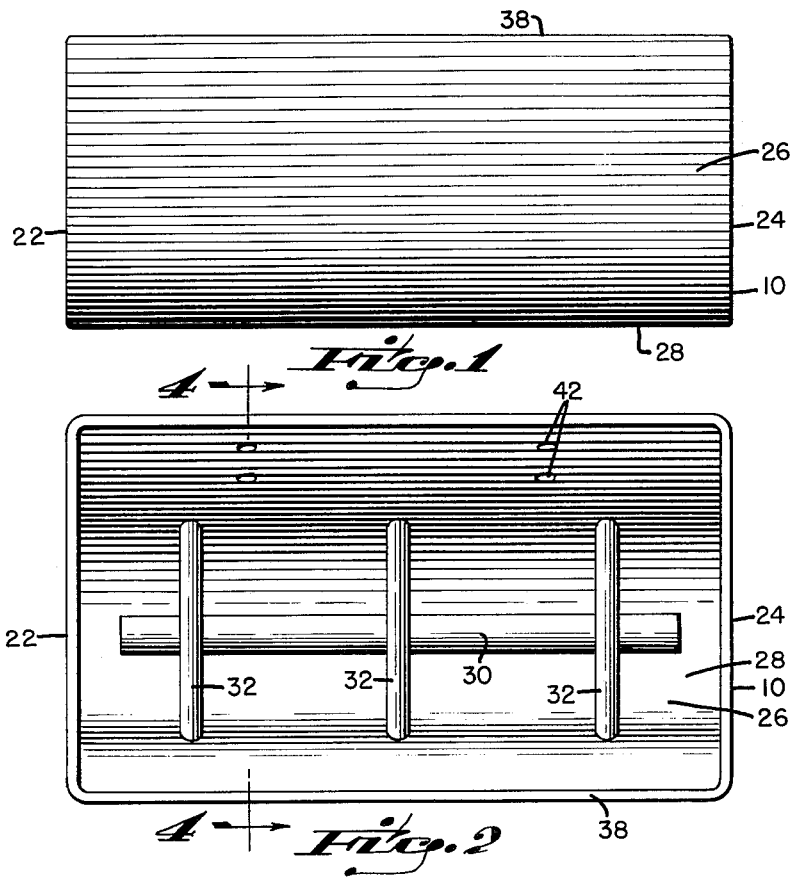
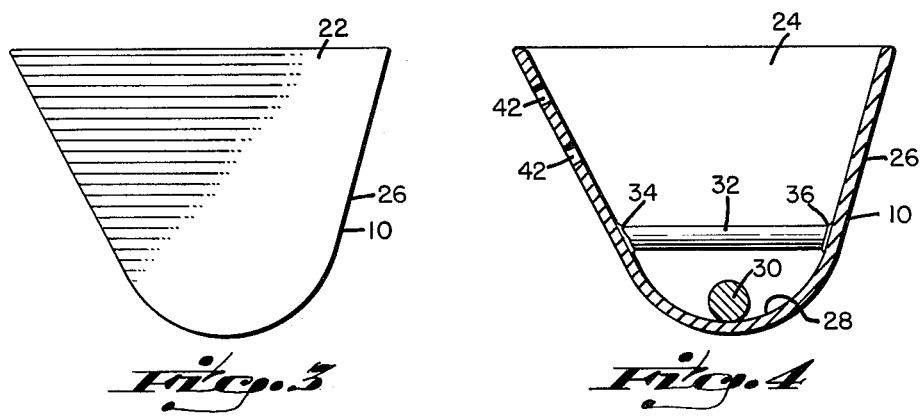
INVENTOR.
HAROLD B. BIEHN
BY
ATTORNEY Oct. 19, 1965    H. B. BIEHN    3,212,625
CONVEYOR BUCKET CONSTRUCTION
Filed March 28, 1963    2 Sheets-Sheet 2
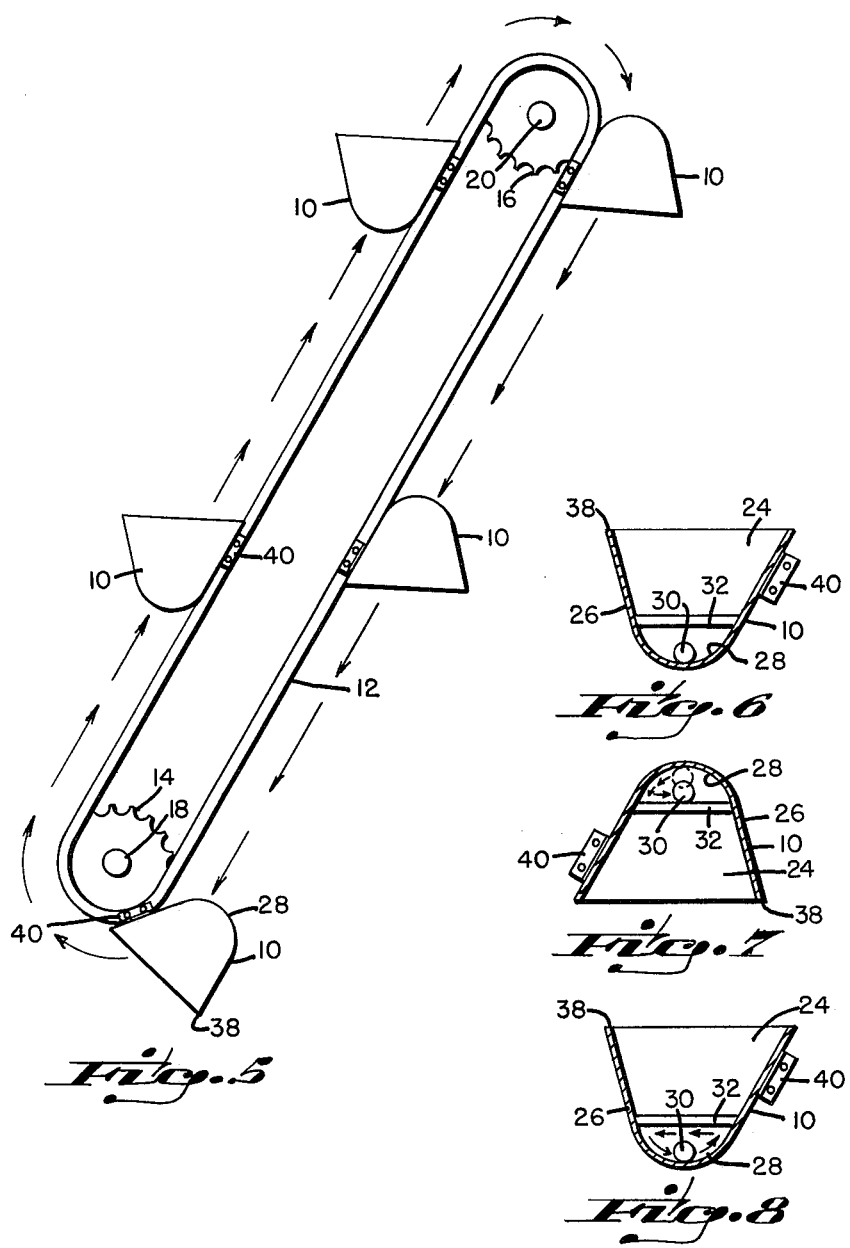
INVENTOR.
HAROLD B. BIEHN
BY
J. Warren Kinney Jr.
ATTORNEY

United States Patent Office 3,212,625
Patented Oct. 19, 1965

3,212,625
CONVEYOR BUCKET CONSTRUCTION
Harold B. Biehn, P.O. Box 110, Greenfield, Ohio
Filed Mar. 28, 1963, Ser. No. 268,818
13 Claims. (Cl. 198—141)

The present invention relates to a bucket conveyor of the type which comprises one or more endless chains driven over upper and lower sprockets, certain links of the chains having attached thereto open-topped buckets which in ascending carry bulk material from a lower to a higher elevation at which the material is discharged, the buckets in returning to the lower elevation being inverted, and thereafter righted again for refilling and ascending.

In conveying certain forms of bulk materials, particularly those which are moisture-bearing in nature, there is noted a tendency of the material to compact within the conveyor buckets with the result that discharge thereof from the buckets is incomplete at times. If the build-up of compacted material within the buckets persists, as it often does, the performance of the conveyor is reduced beneath its rated capacity and costly inefficiency results.

An object of the present invention is to provide simple and effective means, automatic in its action, for dislodging compacted bulk material from conveyor buckets so that after discharge the buckets will be conditioned to accept a full charge of material to be conveyed, thereby preserving the rated capacity of the conveyor and maintaining the maximum operating efficiency.

Another object is to achieve the foregoing objective with the use of inexpensive trouble-free means requiring no maintenance service or parts replacements throughout the useful life of the conveyor.

A further object is to provide means for the purpose stated, utilizing a single movable part which is practically indestructible and hightly reliable in the performance of its intended function.

The foregoing and other objects are attained by the means described herein and illustrated upon the accompanying drawings, in which:

FIG. 1 is a side elevational view of an open-topped conveyor bucket of the type utilized in a conveyor as illustrated by FIG. 5, and embodying the means of the present invention.

FIG. 2 is a top plan view of the improved bucket.

FIG. 3 is an end elevation of the bucket.

FIG. 4 is a transverse cross-section taken on line 4—4 of FIG. 2.

FIG. 5 is a side elevational view of a bulk material conveyor embodying the invention.

FIG. 6 is an end view showing an end of the bucket cut away, the bucket being in upright position for conveying a charge of material.

FIG. 7 is a view similar to FIG. 6, but showing the bucket in inverted discharging condition.

FIG. 8 is a view similar to FIG. 6, indicating the action of a clearing bar caged therein.

In the illustration of FIG. 5 is shown a bulk material conveyor comprising a series of buckets 10 fixed at intervals to a conveyor chain 12, which latter is trained over a pair of sprockets 14 and 16 supported upon horizontal shafts 18 and 20. Either or both of the shafts mentioned may be driven by means of a motor or other power source, (not shown) in a manner which is conventional in the art. For purpose of explanation, but without limitation of the invention thereto, shaft 20 may be considered the driving shaft and 18 may be considered an idler driven by chain 12. The conveyor may utilize more than one chain 12, if desired, with corresponding reaches of the chains moving in spaced parallelism and at a common rate of speed. It may be assumed, however, for purposes of clarity and simplicity of explanation, that the conveyor employs a single chain 12.

Buckets 10 may be identical in construction, and each may comprise an open-topped elongate receptacle having opposite end walls 22 and 24, which flank a trough-shaped main wall 26 defining sides and bottom of the bucket. Main wall 26 may consist of a single sheet of metal bent to U-shape so as to provide an arcuate bottom 28; or in the alternative, the bucket may be in the form of a casting of steel or other suitable metal, with integral main and end walls. In either case, the bucket will have a bottom which is concave inside and formed preferably on a smooth curve or arc, the resulting trough extending lengthwise of the bucket from end 22 to end 24.

The smooth arcuate wall of the bucket interior normally supports a loose clearing bar 30 which is preferably cylindrical of shape, and extends lengthwise of the bucket to nearly reach the bucket ends. The clearing bar preferably is quite heavy, and is free to roll across the arcuate bottom of the bucket whenever the bucket is tilted in following the conveyor chain 12 about its supporting sprockets. The purpose of the clearing bar is to loosen and free any bulk material which may have become impacted in the bottom of the bucket.

Clearing bar 30 necessarily is to be confined to some extent, in order to prevent its becoming disassociated from the bucket interior. As disclosed herein, a suitable caging means is provided consisting of several transverse struts or rods 32 having their ends 34 and 36 welded or otherwise fixed to the bucket main wall at opposite sides of the arcuate bottom 28. The struts or rods 32 are spaced from the arcuate bottom a distance considerably in excess of the diameter of clearing bar 30, to ensure free rolling of the bar thereover incident to tilting of the bucket. Bar 30 may be of iron or steel, by preference.

When the bucket is inverted, as in FIG. 7, clearing bar 30 will rest upon the struts 32 and may roll lengthwise of the struts depending upon the angle of tilt. In the normal operation of a conveyor or elevator such as FIG. 5 illustrates, a bucket reaching and passing over the upper sprocket 16 dumps its contents, while the clearing bar proceeds to roll along the arcuate bottom to follow a path indicated by the arrows of FIG. 8, the circuit being completely traversed by bar 30 as the bucket rights itself at the foot or loading end of the conveyor. The clearing bar in moving along the arcuate bottom, across the cage struts, and again along the bottom wall, effectively loosens any material impacted against the bucket bottom. As the major action of the clearing bar occurs while the bucket is inverted, the bucket when righted is in condition to receive a full charge of material to be elevated by the conveyor.

As will be understood, successive buckets when righted at the lower end of the conveyor, may be filled in any suitable manner. They may be filled from a hopper, for example, or they may scoop up a charge from a pile of material into which the buckets may dip for self-filling. Thus, the buckets may scoop up bulk material from a railroad car, a ship's hold, or other source of supply, in which case one edge 38 of the bucket serves as a scoop lip. The conveyor illustrated is adapted for many material-transfer uses, including the loading and unloading of bulk materials to and from storage hoppers, cars, trucks and other conveyances, as well as storage dumps or bins. The length of the conveyor, its angle of operation, and the number of buckets employed, may vary with the conditions and circumstances of use.

The character 40 indicates a bracket which may be fastened to a bucket by means of bolts or rivets passing through holes 42 in the bucket main wall, the bracket being in turn anchored upon conveyor chain 12 in any suitable or appropriate manner. The particular manner of mounting the bracket upon the bucket and upon the chain is a matter of choice, however, and is not of concern to the present invention.

From the foregoing explanation, it will be understood that buckets ascending the conveyor with a charge of bulk material, which may be granular or in powdered form, will dump its charge as the buckets turn over at the top of the conveyor; and as the buckets invert, the clearing bar 30 will automatically roll along the arcuate bottom of the bucket to dislodge any material compacted or adhering against the inner surface of the bucket bottom so that by the time the bucket is again in position for charging, it will be clear in readiness for receiving a full charge. The conveyor accordingly will never become choked with compacted material to be carried indefinitely by the buckets due to failure of discharge.

The apparatus of the invention is obviously simple and inexpensive to manufacture and install, and will outlast the conveyor mechanism. It is, moreover, entirely free of all maintenance expense and parts replacement difficulties.

It is to be understood that various modifications and changes may be made in the structural details of the apparatus, within the scope of the appended claims, without departing from the spirit of the invention.

What is claimed is:

1. A conveyor of bulk material, comprising in combination, a series of open-topped buckets, and means for moving the buckets in one direction in a righted condition with the open tops thereof uppermost for receiving a charge of material, and in another direction wherein the buckets are inverted to discharge said material, a freely shiftable clearing element within at least one bucket for dislodging material adhering to the bucket interior when the bucket is in other than righted condition, and means disposed wholly within said one bucket to limit bodily shifting of the clearing element in the direction of the open top of said bucket.

2. The combination as set forth in claim 1, wherein the clearing element is in the form of a weighted cylindrical bar adapted to roll freely within the confines established by the limiting means aforesaid.

3. A conveyor of bulk material, comprising in combination, a series of open-topped elongate buckets, and means for moving the buckets in one direction in a righted condition with the open tops thereof uppermost for receiving a charge of material, and in another direction wherein the bucket are inverted to discharge said material, said buckets each having a main wall including a bottom, and opposite end walls flanking said bottom, a clearing bar normally resting freely upon the bucket bottom when the bucket is in righted condition, said bar being so dimensioned relative to the bucket bottom, as to be shiftable along the bottom to dislodge any material adhering thereto, and restraining means disposed entirely within each bucket and spanning the bottom thereof at a distance greater than the thickness of the clearing bar, whereby upon inversion of a bucket the clearing bar may fall away from the bucket bottom and rest upon said restraining means.

4. The combination as set forth in claim 3, wherein the clearing bar is of greater length than the width of the bucket bottom, and of lesser length than the space between the end walls thereof.

5. A conveyor of bulk material, comprising in combination, a series of open-topped elongate buckets, and means for bodily moving the buckets in one direction in a righted condition with the open tops uppermost to receive a charge of material, and in another direction wherein the buckets are inverted to discharge said material, said buckets each having a main wall including an arcuate bottom, and opposite end walls flanking said bottom, a weighted cylindrical clearing bar resting freely bottom, a weighted cylindrical clearing bar resting freely upon the arcuate bottom when the bucket is in righted condition, said bar having opposite ends disposed normal to but spaced from the end walls of the bucket whereby the bar is free to roll upon the arcuate bottom thereof, and means within each bucket providing a cage limiting bodily movement of the clearing bar toward the open top of the bucket when the latter is inverted, said cage means being spaced from the arcuate bottom a distance greater than the diameter of the cylindrical clearing bar.

6. The combination as set forth in claim 5, wherein the cage means comprises a plurality of spaced struts spanning the main wall of the bucket, said struts being disposed in a common plane intermediate the bucket bottom and the open top thereof.

7. The combination as set forth in claim 5, wherein the cage means comprises a plurality of spaced struts spanning the main wall of the bucket intermediate the bucket bottom and the open top thereof.

8. A conveyor of bulk material, comprising in combination, a series of open-topped elongate buckets, and means for bodily moving the buckets in one direction in a righted condition with the open tops uppermost to receive a charge of material, and in another direction wherein the buckets are inverted to discharge said material, said buckets each having a U-shaped main wall including an arcuate bottom, and opposite end walls flanking said bottom, a weighted cylindrical clearing bar extending longitudinally between the end walls with freedom to roll along the arcuate bottom when the bucket is in righted condition, a plurality of spaced struts supported wholly within each bucket transversely of the clearing bar and in substantial parallelism with the bucket end walls, said struts being spaced from the arcuate bottom a distance exceeding the diameter of the clearing bar and adapted to support the latter for rolling movement along the struts as the buckets assume an inverted position.

9. The combination as set forth in claim 8, wherein the means for bodily moving the buckets operate to invert and right the buckets in alternation.

10. The combination as set forth in claim 8, wherein the struts are in the form of straight rods having opposite ends secured to the U-shaped main wall of the bucket in spanning relation to the arcuate bottom, and at equal distances from the open top thereof.

11. A conveyor bucket comprising a trough-shaped main wall including an arcuate bottom, and opposite end walls flanking said bottom, a weighted elongate clearing bar extending longitudinally between the bucket end walls with freedom to shift laterally within the trough of the bucket bottom, and restraining means spanning said main wall intermediate the bottom and the open top of the bucket, to preclude bodily displacement of the clearing bar from the bucket interior when the bucket is inverted.

12. The device as set forth in claim 11, wherein said restraining means comprises a plurality of spaced struts supported wholly within each bucket transversely of the clearing bar and in substantial parallelism with the bucket end walls, said struts being spaced from the arcuate bottom a distance exceeding the diameter of the clearing bar and adapted to support the latter for rolling movement along the struts as the buckets assume an inverted position.

13. The device as set forth in claim 11, wherein the clearing bar is cylindrical in form, and the restraining means comprises a plurality of struts in the form of straight rods having opposite ends secured to the trough-shaped main wall in spanning relation to the arcuate bottom thereof, to support the clearing bar when the bucket is inverted.

References Cited by the Examiner

UNITED STATES PATENTS 2,584,025   1/52   Kelsey _____ 198—152
2,916,135   12/59  Likens _____ 198—144

SAMUEL F. COLEMAN, *Primary Examiner.*

ERNEST A. FALLER, *Examiner.*